United States Patent Office 3,197,658
Patented July 27, 1965

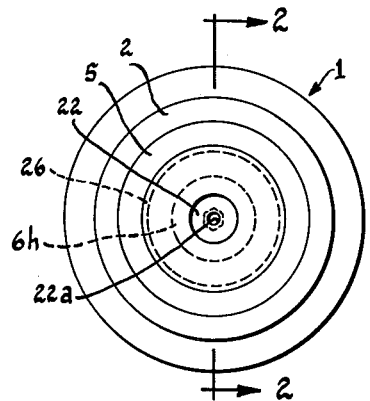
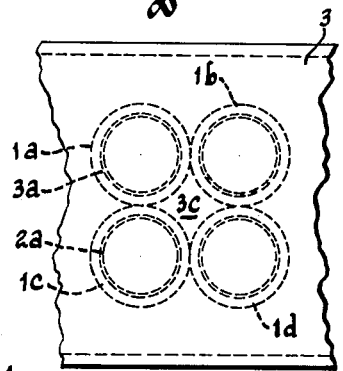
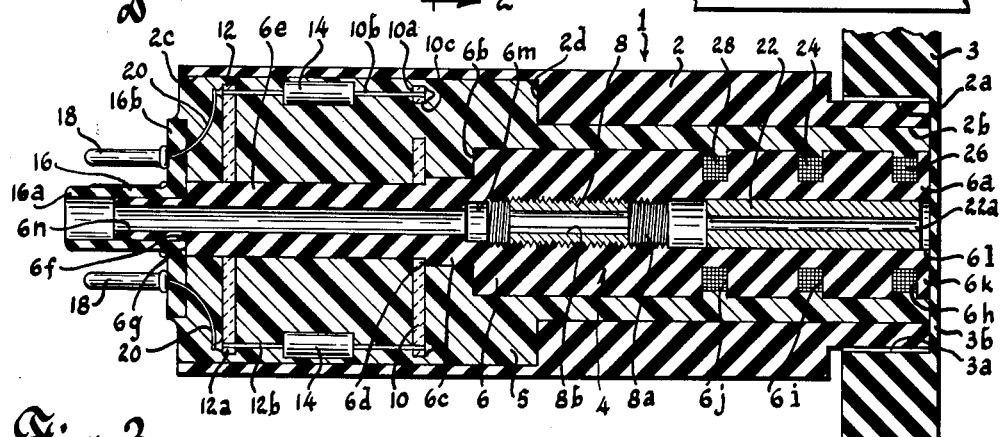
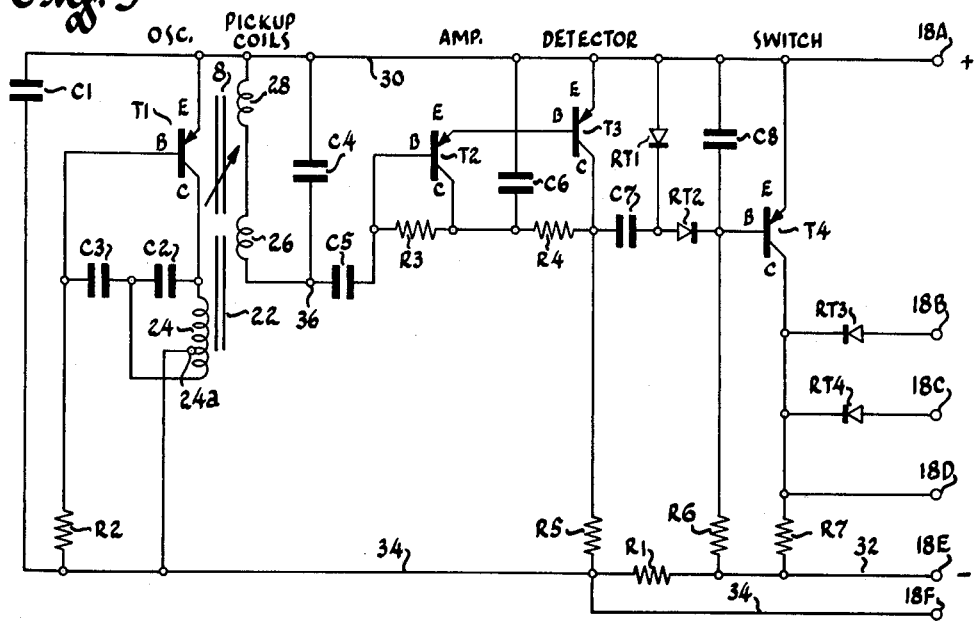

3,197,658
PROXIMITY RESPONSIVE DEVICE
Richard J. Byrnes, West Allis, Walther Richter, River Hills, Robert W. Spink, Wauwatosa, and Merle R. Swinehart, Brookfield, Wis., assignors to Cutler-Hammer, Inc., Milwaukee, Wis., a corporation of Delaware
Filed May 25, 1961, Ser. No. 112,716
11 Claims. (Cl. 307—116)

This invention relates to proximity responsive devices and more particularly to devices which respond to and detect and identify the approach or passage of traveling members near thereto.

While not limited thereto, the invention is especially applicable to article control systems for conveyors or the like for detecting and identifying codes on traveling article carriers whereby to control the routing of such article carriers.

An object of the invention is to provide an improved proximity responsive device.

A more specific object of the invention is to provide improved means for detecting and identifying traveling articles approaching or passing near thereto and for providing output signals in response thereto.

Another specific object of the invention is to provide improved means for detecting and identifying passage of groups of electrically conducting members arranged in predetermined codes.

A further specific object of the invention is to provide an improved proximity responsive device having better directional characteristics whereby a plurality of such devices can be mounted close to one another without interference therebetween.

Other objects and advantages of the invention will hereinafter appear.

According to the invention, there is provided a proximity probe having a sensing end or probe tip and a plug end provided with electrical terminals and adapted to be plugged into a tube type socket or the like. The probe is provided with pickup coils for sensing the presence of electrically conducting material passing near the probe tip and an electrical circuit for providing an electrical output signal in response thereto. The circuit comprises an oscillator for providing alternating voltage of a predetermined frequency to the pickup coils, an amplifier for amplifying the signal derived from the pickup coils, a detector of the voltage doubler type for demodulating the amplified signal and a switch circuit for enabling use of the probe alone or in combination with one or more other similar probes to identify a code. These circuit elements are mounted within and potted inside the probe to afford a unitary device of the plug-in type.

The above mentioned and other objects and advantages of the invention and the manner of obtaining them will best be understood by reference to the following detailed description of an exemplary embodiment of a proximity responsive device taken in conjunction with the accompanying drawings, wherein:

FIGURE 1 is a front or sensing end view of a proximity probe constructed in accordance with the invention;

FIG. 2 is a cross-sectional view taken along line 2—2 of FIG. 1 and including a probe tip supporting member;

FIG. 3 is a circuit diagram of the proximity probe of FIGS. 1 and 2; and

FIGS. 4 is a fragmentary front view of a member for supporting the sensing ends of a plurality of probes.

Referring to FIGS. 1 and 2, there is shown a proximity probe 1 having a generally cylindrical configuration and being provided with a reduced front or sensing end portion or probe tip and having electrical connectors at the rear or plug end for connection to an external utilization circuit. The probe is provided with an insulating housing comprising a generally tubular outer member 2 of electrically insulating material. As shown in FIGS. 1 and 2, the right-hand front end of tubular member 2 is provided with a reduced end portion 2a having a smaller external diameter than the remainder of the tubular member which is preferably of constant diameter throughout the remainder of its length.

Reduced end portion 2a is provided for the purpose of accommodating a supporting member 3 for supporting the sensing ends of the probes particularly when a plurality of such probes are mounted adjacent to one another. Supporting member 3 is a rectangular plate or the like comprised of non-magnetic electrically insulating material and is provided with a plurality of cylindrical recesses 3a bored from the rear surface almost through the plate leaving a thin surface 3b of insulating material covering the probe tip. Recesses 3a are each of a diameter to freely receive reduced portion 2a of the probe tip and surface 3b bears against the probe tip to support the probe and to maintain it in its electrical socket. A plurality of probes 1a, 1b, 1c and 1d may be mounted adjacent one another. When mounted in this way, the tubular housing members of the probes at a point on the periphery of the larger portions thereof are contiguous to one another as shown in FIG. 4. Due to the directivity of the sensing function of the probes hereinafter more fully described, the latter may be mounted this close to one another. Also, the larger diameter along the length of the probe is provided to provide sufficient space for mounting the circuit elements hereinafter described in connection in FIG. 3. As shown in FIG. 4, the probes are provided with the reduced end portions 2a so that portion 3c of supporting plate 3 between adjacent probe tips is not broken off when recesses 3a are bored and plate 3 remains integral between the recesses to support the probe tips.

Tubular member 2 is provided with a stepped bore therethrough comprising a bore 2b of constant diameter extending from the front end thereof to approximately the midpoint of its length and a larger bore 2c of constant diameter extending from such midpoint to the rear end of the tubular member. As will be apparent, smaller bore 2b and larger bore 2c are joined by an annular shoulder 2d.

The probe is provided with an internal structure indicated generally by 4 freely received within tubular housing member 2 in the bore therein and in spaced relation to the walls of the bore. The space or volume between internal structure 4 and tubular housing member 2 within the bore is required for connecting wires extending to the coils from the circuit elements at the rear end of the probe and is completely filled or potted with thermosetting material 5 which rigidly secures internal structure 4 within the bore.

Internal structure 4 comprises means mounting and supporting the circuit elements and conductors shown in FIG. 3. This mounting and supporting means comprises an insulating supporting member or rod 6 having a generally cylindrical configuration and being provided with a bore therethrough. Rod 6 extends throughout the length of housing member 2 and projects a short distance beyond the rear end of the housing member for purposes hereinafter described. Rod 6 is provided with an enlarged cylindrical portion 6a having the right-hand end thereof flush with the right-hand end of housing member 2. Enlarged cylindrical portion 6a is preferably of constant external diameter except for grooves therein hereinafter described and extends from the sensing end of the probe beyond the midpoint thereof or a short distance beyond annular shoulder 2d in housing member 2. The remainder of rod 6 constitutes a reduced portion of substantially smaller external diameter than enlarged portion 6a. This reduced portion of rod 6 is provided with three successively smaller external diameters from annular shoulder 6b at the left-hand end of enlarged portion 6a to the left-hand or rear end of the rod. That is, extending from shoulder 6b is a short length of substantially reduced portion 6c ending at a small annular shoulder 6d from which the rod continues only slightly reduced in diameter forming a slightly reduced portion 6e of constant diameter to approximately the rear end of housing member 2. The portion 6f of rod 6 extending beyond the rear end of housing member 2 is still further reduced in diameter to provide an annular shoulder 6g between portions 6e and 6f.

The sensing end of rod 6 is provided with three annular grooves 6h, 6i and 6j axially spaced along enlarged portion 6a for accommodating sensing coils hereinafter described. As shown in FIG. 2, groove 6h is immediately adjacent the sensing end of rod 6, there being only enough insulating material 6k between groove 6h and the end of the rod to afford a sturdy retaining wall for the coil wound in the associated groove. Groove 6i is spaced from groove 6h and groove 6j is spaced from groove 6i in the axial direction of the rod, the spacing between the grooves being substantially equal.

Rod 6 is provided with a stepped bore extending axially therethrough comprising a first bore portion 6l extending from the sensing end of the rod a short distance beyond groove 6j, a second bore portion 6m of smaller diameter than the first bore portion extending from the latter to approximately shoulder 6b and a third bore portion 6n of still smaller diameter extending from bore portion 6m rearwardly through the remainder of the rod. Bore portion 6m is sufficiently smaller than bore portion 6l to afford threading of the same. As shown in FIG. 2, bore portion 6m is threaded from its right-hand end through substantially its entire length.

Threaded bore portion 6m is provided with tuning means comprising a vernier tuning member 8 such as a tuning slug or the like. Tuning member 8 is comprised of magnetic material such as powdered iron or the like and is of cylindrical form having external threads 8a throughout its length for meshing with the threads in the bore. Tuning member 8 is provided with an axial bore 8b having a suitable cross-sectional shape such as hexagonal or the like for complementary engagement by an end of a similarly shaped, elongated tool insertable through bore portion 6n. As will be apparent, tuning member 8 is rotatable by such tool to effect axial adjustment thereof in the bore relative to the coils hereinafter described. The tuning member 8 when properly adjusted may be secured into place with suitable locking means such as application of cement between threads 8a and the threads within bore portion 6m.

Means are provided at the rear portion of rod 6 for mounting the circuit elements and connections shown in FIG. 3. This mounting means comprises a pair of printed circuit members 10 and 12 mounted in spaced relation on reduced portion 6e of rod 6. Each such printed circuit member 10 and 12 comprises a flat disc of insulating material slightly smaller in external diameter than the internal diameter of enlarged portion 2c of the bore in housing member 2. Each such insulating disc is provided with a central round hole to receive reduced portion 6e of rod 6 in close fitting engagement. Disc 10 is positioned against shoulder 6d of the rod and preferably is rigidly secured as by cementing or the like to rod 6. Disc 12 is spaced from disc 10 rearwardly of the probe a sufficient distance to provide space between the discs for mounting the electrical circuit elements hereinafter described. Each insulating disc 10 and 12 is provided with suitable electrical conductor strips secured thereto as by printing and is also provided with holes 10a and 12a for receiving the conductors 10b and 12b secured to the electrical elements 14, the ends of the conductors being soldered on opposite sides of the respective discs to provide electrical connections to the printed conductor strips. Disc 10 is spaced from shoulder 6b to provide clearance for conductors extending therefrom to the coils. Each such insulating disc is further provided with one or more apertures such as 10c in suitable locations between printed conductor strips to afford flow of potting material into all the spaces among the circuit elements.

Means are provided for electrically connecting the probe to an external circuit. This connecting means comprises an electrical connector plug having an insulating base 16 and a plurality of angularly arranged connectors 18 rigidly secured to the base. Base 16 comprises a tubular portion 16a in close fitting engagement with and surrounding reduced end portion 6f of rod 6 and an integral circular flange portion 16b at the inner end of tubular portion 16a. Flange portion 16b abuts shoulder 6g on the rod and partially closes the open rear end of tubular housing member 2. Flange portion 16b is provided with angularly arranged holes therethrough for accommodating connectors 18 which are rigidly secured to flange portion 16b by riveting on the opposite side or the like. Connectors 18 extend from flange portion 16b parallel to tubular portion 16a of base 16 and are adapted for receipt in an electrical socket. Conductors 20 electrically connect connectors 18 to the printed circuit on disc 12.

An elongated core 22 having a cylindrical configuration is rigidly secured as by cementing within bore portion 6l in rod 6 and extends from slightly beyond the right-hand edge of groove 6h to the left-hand edge of groove 6j approximately. Core 22 is comprised of magnetic material such as ferrite or the like to afford a magnetic path for the flux developed by the coils as hereinafter described. Core 22 is provided with an axial bore 22a therethrough and is offset slightly to the right relative to coils 24, 26 and 28 to enable tuning of the coils by adjustment of tuning member 8 toward core 22.

Referring to FIG. 3, there is shown a circuit diagram for the proximity probe of FIGS. 1 and 2. Means is provided for sensing an electrically conducting member in the area of the sensing end of the probe. This sensing means comprises a transformer comprising a plurality of electrically conducting coils and including a primary coil or winding 24 in the central annular groove 6i and two secondary coils or windings 26 and 28 in annular grooves 6h and 6j, respectively, secondary winding 26 being nearest the sensing end of the probe. In FIG. 3, magnetic core 22 is represented by a pair of parallel lines and tuning member 8 is represented by a pair of parallel lines having a diagonal arrow therethrough to indicate its adjustability toward or away from magnetic core 22.

Connectors 18 of FIG. 2 are identified more particularly in FIG. 3 as terminals 18A, 18B, 18C, 18D, 18E and 18F. Terminals 18A and 18E are connectable to a direct current supply source as shown by the positive and negative symbols respectively adjacent thereto. Terminal 18A is connected directly to a conductor 30 and terminal 18E is connected to conductor 32. Conductor 32 is connected through a resistor R1 to conductor 34. A filter capacitor C1 is connected between conductors 30 and 34. Terminal 18F is connected directly to conductor 34 to afford connection of external resistance across capacitor C1 between terminals 18A and 18F to change the sensitivity of the oscillator.

As shown by the legends above FIG. 3, the circuit comprises pickup coils for sensing the presence of conducting material near the probe tip, an oscillator for supplying the pickup coils with oscillating voltage, an amplifier for amplifying the signal developed at the pickup coils, a detector for detecting the amplified signal and a switch circuit for adapting the probe for use alone or in combination with one or more like probes.

The oscillator comprises a transistor T1, coil 24, capacitors C2 and C3 and a resistor R2. Emitter E of transistor T1 is connected to conductor 30 and collector C thereof is connected through the upper portion of coil 24 and tap 24a to conductor 34. Capacitor C2 is connected across coil 24. Capacitor C3 is connected from the junction between the lower end of coil 24 and capacitor C2 to base B of transistor T1. Base B of transistor T1 is connected through resistor R2 to conductor 34.

Coils 28 and 26 are connected in series in that order from conductor 30 to input terminal 36 of the amplifier. A tuning capacitor C4 is connected across coils 28 and 26 to tune coils 28 and 26 to the oscillator frequency.

The amplifier comprises a coupling capacitor C5, a first amplifier stage of the emitter follower type comprising a transistor T2, resistors R3 and R4 and a capacitor C6 and a second amplifier stage comprising a transistor T3 and a resistor R5. Emitter E of transistor T3 is connected to conductor 30. Collector C of transistor T3 is connected through load resistor R5 to conductor 34. Base B of transistor T3 is connected directly to emitter E of transistor T2. Collector C of transistor T2 is connected through a filter capacitor C6 to conductor 30. Resistor R3 is connected between base B and collector C of transistor T2 to provide bias voltage for this transistor. Collector C of transistor T2 is also connected through resistor R4 to the junction between collector C of transistor T3 and load resistor R5. Resistor R4 and capacitor C6 form an R-C filter for supplying direct current to collector C of transistor T2. Resistor R4 also limits the base current of transistor T3. Input terminal 36 is connected through coupling capacitor C5 to the base of transistor T2.

The detector comprises unidirectional conducting devices such as diodes RT1 and RT2, capacitors C7 and C8 and a resistor R6. Capacitor C8 and resistor R6 are connected in series in that order between conductor 30 and conductor 32. Diodes RT1 and RT2 are connected in series from conductor 30 to the junction between capacitor C8 and resistor R6 to conduct current in that direction. Capacitor C7 is connected from collector C of transistor T3 to the junction between diodes RT1 and RT2. The switch circuit comprises a transistor T4, unidirectional conducting devices such as diodes RT3 and RT4 and a resistor R7. Emitter E of transistor T4 is connected to conductor 30 and collector C thereof is connected through resistor R7 to conductor 32. Diode RT3 is connected to conduct current in the direction from terminal 18B to collector C of transistor T4. Diode RT4 is connected to block current flow in the direction from collector C of transistor T4 to terminal 18C.

The operation of the system in FIG. 3 will now be described. The oscillator is of the Hartley type except that a transistor is employed therein rather than a tube. When a direct voltage is applied across conductors 30 and 34, current oscillations are initiated in the parallel resonant circuit comprising capacitor C2 and coil 24. Current flows from conductor 30 through the emitter-base junction E-B of transistor T1 and resistor R2 to conductor 34, this current being limited by resistor R2. This base current renders transistor T1 conducting through its emitter-collector junction and the upper portion of coil 24. When current flows through the upper portion of coil 24, a voltage is induced in the lower portion of coil 24 in the opposite direction. As a result, an alternating current flows in the parallel resonant circuit alternately to charge capacitor C2 with opposite polarity. Each time capacitor C2 is charged positive on its left side and negative on its right side, a positive feedback voltage is applied through coupling capacitor C3 to base B of transistor T1 to control the transistor. Coil 24 is tapped at an intermediate point to supply energy to base B of transistor T1 by positive feedback to maintain the oscillations.

The alternating current flowing in primary coil 24 induces equal and opposed voltages across secondary coils 26 and 28. Tuning member 8 is adjusted toward magnetic core 22 for null output signal, that is, minimum output signal when there is no conducting material in the sensing area. Core 22 is rigidly secured as by cementing in bore 6l in the position hereinbefore described and tuning member 8 is thereafter carefully adjusted for null output signal from the secondary coils. Consequently, no output signal appears at terminal 36.

Supply voltage is also applied from conductors 30 and 32 across emitter E and collector C of transistor T4 in series with resistor R7. Capacitor C8 charges positive on its upper side in series circuit with resistor R6 across conductors 30 and 32 to a value equal to the voltage drop across the emitter-base junction of transistor T4. The sum of the forward voltage drops across diodes RT1 and RT2 must be larger than the emitter-base voltage required to cause saturation conduction in transistor T4. For example, the sum of the forward voltage drops across the diodes may be approximately 1.2 volts for an emitter-base voltage of approximately 0.4 volt. Charging of capacitor C8 causes a negative voltage to be applied to base B relative to emitter E to render transistor T4 conducting. As a result, transistor T4 normally shunts a load connectable between terminal 18A and terminal 18B to render such load unenergized and ineffective as hereinafter more fully described.

Supply voltage is also applied from conductors 30 and 34 across emitter E and collector C of transistor T3 in series with resistor R5. Supply voltage is further applied from conductors 30 and 34 across capacitor C6 and resistors R4 and R5 in series. As a result, capacitor C6 charges. A negative voltage is supplied from conductor 34 through resistors R5 and R4 to collector C of transistor T2. The amplifier comprises two stages including the circuit of transistor T2 and the circuit of transistor T3. The circuit of transistor T2 is an emitter follower stage. In view of the high impedance of secondary coils 26 and 28, an emitter follower is employed as the first stage of the amplifier to afford a low impedance output. As will be apparent, the load for the emitter-follower stage is connected in the circuit of emitter E of transistor T2 and comprises the emitter-base junction of transistor T3.

A negative voltage is applied through resistor R3 to base B of transistor T2 to cause this transistor to conduct in a circuit from conductor 30 through the emitter-base junction of transistor T3, the emitter-collector junction of transistor T2 and resistors R4 and R5 to conductor 34. The base current of transistor T3 causes this transistor to conduct in a circuit from conductor 30 through the emitter-collector junction of transistor T3 and resistor R5 to conductor 34. The value of resistor R3 is selected so that the amplifier normally operates at an intermediate point in its range to provide for modulation by an alternating input voltage thereto. Initially, current flows from conductor 30 through diode RT1, coupling capacitor C7 and resistor R5 to conductor 34 whereby to charge capacitor C7 positive on its right side and negative on its left side to a voltage level corresponding to the voltage of collector C of transistor T3.

When an electrically conducting member passes by the probe tip through the directive magnetic field thereat, eddy currents are induced in such conducting material which distort the magnetic field. This causes the voltages of secondary coils 26 and 28 to be unbalanced to afford an alternating output voltage at terminal 36. This alternating voltage is applied through coupling capacitor C5 to base B of transistor T2 to modulate the output voltage of the amplifier. As a result, a modulated output voltage, that is, an amplified alternating voltage appears at collector C of transistor T3. Capacitor C6 and resistor R4 function as a filter to prevent the alternating component of voltage appearing at collector C of transistor T3 from being transmitted back to transistor T2.

Diodes RT1 and RT2 and capacitors C7 and C8 form a rectifier circuit of the voltage doubler type. This circuit causes the alternating voltage appearing on collector C of transistor T3 to be rectified and causes a unidirectional voltage of substantially twice the amplitude of such alternating voltage to be applied across capacitor C8. This doubled voltage has a polarity such as to charge capacitor C8 positive on its lower side thereby to render base B of transistor T4 positive and to render transistor T4 non-conducting. After the alternating voltage at collector C of transistor T3 ceases, capacitor C8 will lose this charge through resistor R6 and eventually render transistor T4 conducting again.

The voltage doubler rectifier circuit operates to charge capacitor C7 positive on its right side on each negative half-cycle of the amplifier alternatnig output voltage. On each positive half-cycle, the amplifier voltage and the voltage of capacitor C7 are added to apply a double voltage to charge capacitor C8 with the aforementioned polarity. Successive applications of this double voltage charge capacitor C8 to render transistor T4 non-conducting.

Transistor T4 in effect interrupts the circuit between terminals 18A and 18B to apply a corresponding control to a load connectable thereto.

When the conducting member has passed by the probe tip, the voltages of secondary coils 26 and 28 are rebalanced to terminate the alternating current modulating voltage. As a result, capacitor C8 recharges positive on its upper side at a timed rate. When the capacitor C8 recharges, the voltage thereacross increases to again render transistor T4 conducting whereby to shunt the load. The discharging and also the charging times of capacitor C8 are not instantaneous but occur over a period of time sufficiently short in order to avoid overlap between closely spaced conducting members passing by the probe.

Diode RT3 is employed between terminal 18B and collector C of transistor T4 because it has a forward voltage drop substantially equal to the voltage across the emitter-collector junction of transistor T4. When transistor T4 is conducting, it is not a perfect shunt across the load but instead has a small voltage drop thereacross. With diode RT3 in series with a resistive load across terminals 18A and 18B, the forward voltage drop across diode RT3 is sufficient to render the voltage across the resistive load negligible. Diode RT4 is employed to block current flow in the direction from collector C of transistor T4 to terminal 18C. Terminals 18C and 18D are provided to afford connection of one or more proximity probe circuits in a variety of ways to one or more load devices as disclosed in Richard J. Byrnes, James T. Pence and Barney O. Rae copending application Serial No. 112,707, filed May 25, 1961 now Patent No. 3,152,681, dated Oct. 13, 1964.

Important features of the invention reside in the provision of a compact, generally cylindrical proximity responsive device having static elements which adapt the same for potting and which is of the plug-in type to afford ready mounting and electrical connection and replacement. The sensing structure is afforded a sensing magnetic field of maximum length and directivity by the provision of a relatively long magnetic core of relatively small diameter and the provision of sensing coils having a mean diameter substantially equal to the distance between coils whereby the secondary coils have relatively "loose" magnetic coupling to the primary coil.

Also, the coils are given a relatively small cross-section to reduce magnetic losses and to increase the sensitivity of the probe. The directivity of the sensing magnetic field allows mounting of the probes in closely spaced relation without significant interference between the magnetic fields thereof. To further reduce such interference, the oscillators of adjacent probes are preferably given different frequencies by providing one of the probes with different values of capacitance in capacitors C2 and C4 from that in the adjacent probe. For example, one of the probes may be given a frequency of 25,000 cycles per second and the adjacent probe a frequency of 60,000 cycles per second.

While the apparatus hereinbefore described is effectively adapted to fulfill the objects stated, it is to be understood that we do not intend to confine our invention to the particular preferred embodiment of proximity responsive device disclosed, inasmuch as it is susceptible of various modifications without departing from the scope of the appended claims.

We claim:

1. In a proximity responsive device for sensing the passage of metallic members adjacent thereto, a pair of sensing coils, means normally producing opposed alternating voltages in said sensing coils so that no net output voltage is produced thereby, said sensing coils being operable to afford an alternating net output voltage when an electrically conducting member is passed near thereto, an amplifier, means for operating said amplifier to afford a unidirectional output voltage, means for applying said alternating output voltage from said coils to said amplifier to modulate the output voltage thereof, a static switching device, a pair of output terminals connected across said static switching device, means normally operating said static switching device to shunt said output terminals, and means for utilizing the modulated output voltage of said amplifier to operate said static switching device to unshunt said output terminals.

2. In a proximity device responsive to passage of electrically conducting members near thereto for controlling a load, said device comprising a generally cylindrical probe having a sensing tip end and a plug end provided with electrical connectors for connecting the probe to a load, and electrical circuit means embedded within said probe comprising a coil system having an energizing primary coil and a pair of secondary sensing coils, said secondary coils being spaced on opposite sides of said primary coil on a common axis and one of said secondary coils being immediately adjacent the tip end of said probe, magnetic means coupling said secondary coils to said primary coil, oscillator means comprising said primary coil for inducing opposed voltages in said secondary coils to balance the latter so that no net alternating voltage is produced thereby, said magnetic means being operable to unbalance the voltages of said secondary coils when an electrically conducting member passes in the magnetic field at the tip end of said probe, a switching device for controlling a load, and means for utilizing the net alternating voltage of said secondary coils for operating said switching device.

3. The invention defined in claim 2, together with an axial bore extending through said probe, said magnetic coupling means comprising a magnetic core secured within said bore and extending axially in spaced relation to and through said primary and said secondary coils, a magnetic tuning member threaded within said bore and axially spaced from said core, and an axial hole in said tuning member adapted for non-rotatable engagement by an elongated tool inserted from the plug end of said probe through the bore therein for adjusting said tuning member toward said core whereby to balance said secondary coils.

4. The invention defined in claim 3, wherein said magnetic core is rigidly secured within the bore in said probe in a position slightly offset toward the tip end of said probe relative to said coils to facilitate balancing of said secondary coils by adjustment of said tuning member toward said core.

5. The invention defined in claim 2, wherein said secondary coils are connected in series circuit and are wound in opposite directions relative to the primary coil whereby the voltages induced thereacross are in opposition, and a capacitor connected across said secondary coils affording a parallel resonant circuit whereby said secondary coils are tuned to the frequency of said oscillator means.

6. The invention defined in claim 2, wherein said switching means comprises a transistor, means normally applying a voltage to the emitter-base junction of said transistor to maintain said transistor conducting through the emitter-collector junction, said utilizing means comprising means responsive to the alternating voltage from said secondary coils for controlling said emitter-base voltage to render said transistor non-conducting, and output terminals connected across the emitter-collector junction of said transistor for connection to a load.

7. The invention defined in claim 2, wherein said means for utilizing said net alternating voltage of said secondary coils comprises amplifier means, means operating said amplifier means to provide a unidirectional output voltage, means applying said net alternating voltage from said secondary coils to said amplifier means to modulate the unidirectional output voltage thereof, and means for rectifying said modulated output voltage to control said switching means.

8. The invention defined in claim 7, wherein said switching means comprises a transistor, a unidirectional power supply source, a resistor connected in series with the emitter-collector junction of said transistor across said source, a capacitor supplied from said source for applying a voltage to the emitter-base junction of said transistor to render said transistor conducting, and said rectifying means comprises a pair of diodes connected in series across said capacitor, and a capacitor operative with said diodes to double said modulated output voltage to control the first mentioned capacitor thereby to render said transistor non-conducting.

9. In a proximity sensing device for sensing the passage of metallic members adjacent thereto, a primary coil, means for energizing said primary coil with an alternating current, a pair of secondary coils magnetically coupled to said primary coil and wound in opposed balanced relation relative to one another so that no output voltage is normally produced thereby when the associated magnetic field is undisturbed, means for rendering the magnetic field of said coils highly directional comprising an elongated sensing probe mounting said coils in axially spaced apart relation so that said secondary coils are equally spaced on opposite sides of said primary coil and one of said secondary coils is immediately adjacent the sensing end of said probe, said coils being of equal diameter, a magnetic core spaced within and extending coaxially of said coils, said magnetic field being responsive to the pressence of an electrically conducting member near the sensing end of said probe to produce a voltage in the circuit of said secondary coils, means for amplifying said voltage, means for rectifying said amplified voltage, means responsive to said rectified voltage for operating a load device, said magnetic core being slightly displaced axially relative to said coils, and a magnetic member axially spaced from said core and threaded within said probe for adjustment toward said core to balance said secondary coils.

10. The invention defined in claim 9, wherein said threaded magnetic member is provided with an axial hole, and an elongated bore extending from the other end of said probe for insertion of a tool to engage the hole in said threaded magnetic member to effect rotary adjustment of said threaded magnetic member.

11. In a proximity sensing device for detecting the presence of electrically conducting elements adjacent thereto and for providing an output control signal in response thereto, a cylindrical probe having a sensing end and a plug end, said probe comprising a tubular external housing member open at opposite ends, a cylindrical mounting member spaced coaxially within said housing member, said mounting member having a sensing end flush with one end of said housing member and having a plug end extending beyond the other end of said housing member, sensing coils mounted adjacent the sensing end of said mounting member in spaced apart relation comprising a primary coil and a pair of secondary coils, a pair of spaced insulating discs mounted on said supporting member within said housing member between said coils and said other end of said housing member, means mounted between said discs for energizing said primary coil with an alternating voltage, an axial bore extending through said supporting member, magnetic means within said bore for coupling said secondary coils to said pirmary coil, said coils being arranged to provide a directive magnetic field extending axially from the sensing end of said probe, said secondary coils being balanced to provide no net voltage when said magnetic field is undisturbed, conveyance of an electrically conductive element into said magnetic field being effective to cause said secondary coils to provide an output voltage, circuit means mounted between said discs for utilizing said output voltage, potting material filling the space around said supporting member within said housing member, and an electrical connector mounted on the extending end of said mounting member and electrically connected to said circuit means.

References Cited by the Examiner

UNITED STATES PATENTS

| | | | |
|---|---|---|---|
| 1,701,975 | 2/29 | Gunn | 340—258 |
| 2,915,699 | 12/59 | Mierendorf et al. | 324—41 |
| 2,943,306 | 6/60 | Gray | 340—258 |
| 2,971,151 | 2/61 | Mierendorf et al. | 324—41 |
| 2,983,852 | 5/61 | Gray | 340—258 |
| 3,027,467 | 3/62 | Lipman | 340—258 |
| 3,050,662 | 8/62 | Miller et al. | 340—258 |

FOREIGN PATENTS 847,392   9/60   Great Britain.

LLOYD McCOLLUM, *Primary Examiner.*
ROBERT H. ROSE, *Examiner.*